United States Patent [19]

Field

[11] Patent Number: 4,872,789

[45] Date of Patent: Oct. 10, 1989

[54] METHOD AND APPARATUS FOR MACHINING VALVE SEATS AND VALVE STEM GUIDES IN A DEEP-WALLED ENGINE MONOBLOCK WORKPIECE

[75] Inventor: Nathaniel L. Field, Northville, Mich.

[73] Assignee: Ford Motor Company, Dearborn, Mich.

[21] Appl. No.: 331,722

[22] Filed: Apr. 3, 1989

Related U.S. Application Data

[62] Division of Ser. No. 137,994, Dec. 28, 1987, Pat. No. 4,836,719.

[51] Int. Cl.$^4$ .............................................. B23B 41/12
[52] U.S. Cl. ...................................... 408/79; 408/83.5
[58] Field of Search ..................... 408/1 R, 36, 42, 79, 408/80, 82, 83.5; 29/156.7 R, 156.7 A

[56] References Cited

U.S. PATENT DOCUMENTS

| | | | |
|---|---|---|---|
| 3,881,396 | 5/1975 | Case | 408/80 X |
| 4,050,836 | 9/1977 | Anders | 408/80 X |
| 4,692,074 | 9/1987 | Smith et al. | 408/36 X |

*Primary Examiner*—Steven C. Bishop
*Attorney, Agent, or Firm*—Joseph W. Malleck; Roger L. May

[57] ABSTRACT

Valve seats are machined at the end of an axially deep, narrow cavity of a workpiece having an axially clampable surface within the cavity adjacent one or more valve seats. The method comprehends: (a) supporting a rotary driven spindle assembly of sufficient length to extend through the axial extent of the cavity and reach the valve seat, the spindle carrying a cutting tool at its extremity, the support being in a nonrotatable housing effective to fit closely to the interior of the cavity (within a tolerance of 0.01 inches) and effective to move along the axis of the cavity to bring the cutting tool into machining contact with the valve seats; (b) securing a radially rigid but axially resilient diaphragm to the end of the housing, the diaphram extending transversely across the interior of the cavity; (c) afer inserting the housing and spindle into the cavity so that the cutting tool is proximate the valve seat but out of contact therewith, axially clamping a portion, of the diaphragm remote from the spindle, against the axially clampable surface; and (d) moving the rotary driven spindle assembly axially toward the valve seat to conduct machining contact of the cutting tool therewith, the axially resilient diaphragm providing accurate supporting alignment for the tool under even high speed machining conditions.

8 Claims, 5 Drawing Sheets

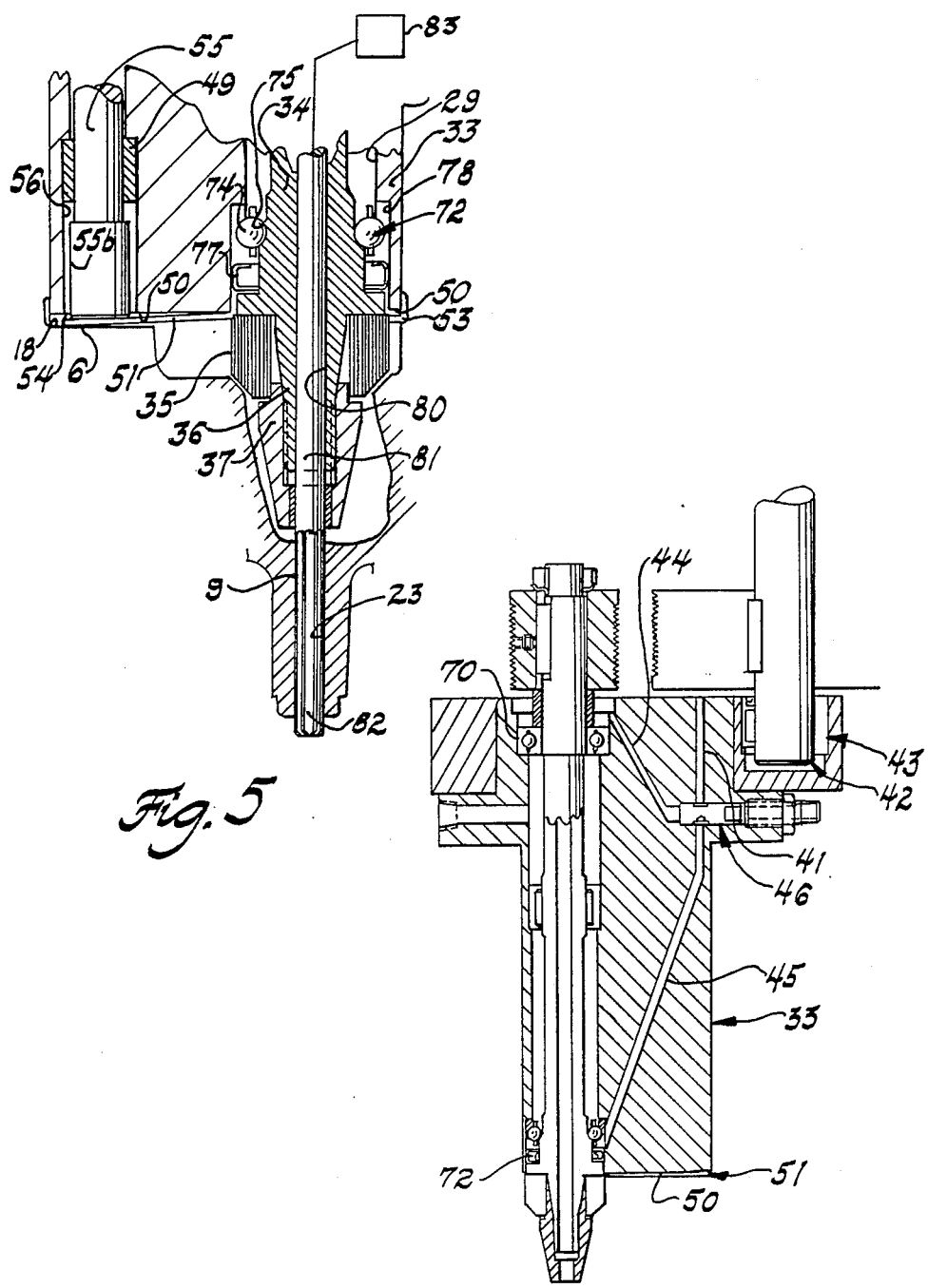

METHOD AND APPARATUS FOR MACHINING VALVE SEATS AND VALVE STEM GUIDES IN A DEEP-WALLED ENGINE MONOBLOCK WORKPIECE

This is a division of application Ser. No. 137,994, filed Dec. 28, 1987, now U.S. Pat. No. 4,836,719.

BACKGROUND OF THE INVENTION

1. Technical Field

This invention relates to the art of machining engine housings and, more particularly, to machining valve seats and valve stem guides in a deep-walled engine monoblock workpiece.

2. Description of the Prior Art

From the earliest use of internal combustion chambers having valve openings, engine housings have been split to contain valve seats about such valve openings in a head, thereby providing easy access for closely supported turning tools to machine or grind such valve seats. Hand-driven machine tools were the earliest used incorporating a pilot rod adapted to fit snugly within the valve stem bore as a concentric aligning guide for the machining of the valve seats (see U.S. Pat. Nos. 1,682,314; 1,721,310; and 2,977,727). A problem encountered with such method was that of misalignment of the pilot rod and the axis of the rotatable support for the cutting tool. This was solved by the incorporation of various types of flexible joints between the milling axis and the pilot tool with which the cutting tool was coupled (see U.S. Pat. Nos. 3,728,940; 4,147,462; and 4,545,706).

Such art does not address problems which have arisen with the recent advent of deep-walled engine monoblock workpieces. Monoblock workpieces with short cylinder walls were first used, such as shown in U.S. Pat. No. 3,521,613, to avoid these problems. This invention addresses directly such problems of machining valve seats associated with very deep-walled monoblock constructions, such as required for an iron monoblock insert housing shown in FIG. 1, which insert is cast into an outer unitary housing portion. When attempting to machine such a monoblock construction, it is difficult to support the machining tool because of the extreme axial distance the machining tool spindle must extend to reach the valve seats. Such difficulty of holding the spindle in close tolerance at the valve seat is exaggerated during high-speed rotary milling operations because of the inherent ability of the spindle to flex at such unsupported end. Even the use of a pilot rod extending into the pre-cast valve seat guide bore does not provide sufficient closely coupled support for maintaining the high degree of accuracy needed in such machining operations today. In fact, it is desirable to eliminate the valve stem guide support rod to enable the simultaneous machining of both the valve stem guide bore as well as the valve seat.

SUMMARY OF THE DRAWINGS

FIG. 5 is an enlarged view of a portion of FIG. 4; and

FIG. 6 is a sectional elevational view along still another line 6—6 of FIG. 2.

SUMMARY OF THE INVENTION

Figure 1:
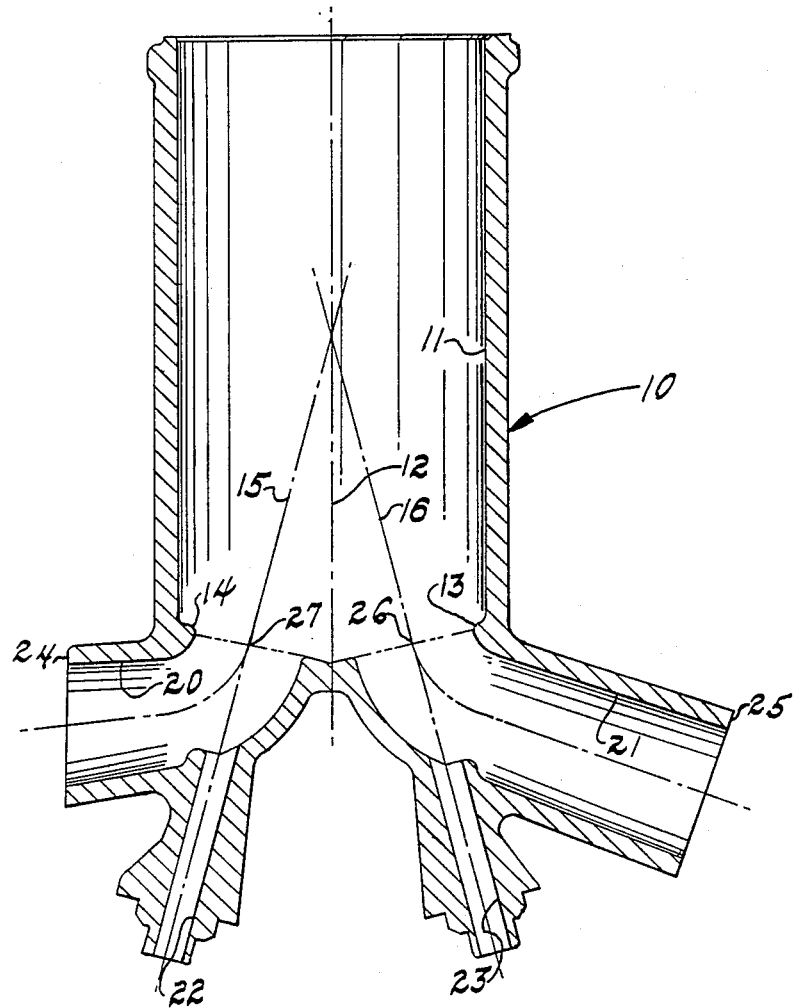
FIG. 1 is a sectional view of through one cylinder of a deep-walled monoblock workpiece which must be machined.

The invention, in a first aspect, is a method of machining a valve seat at the end of an axially deep, narrow cavity of a workpiece having an axially clampable surface within the cavity adjacent such valve seat. The method comprises: (a) supporting a rotary driven spindle of sufficient length to extend through the axial extent of the cavity and reach the valve seat, the spindle carrying a cutting tool at its extremity, the support being in a nonrotatable housing effective to fit closely to the interior of the cavity, without touching, and effective to move along the axis of the cavity to bring the cutting tool into machining contact with the valve seat; (b) securing a radially rigid but axially resilient diaphragm to the end of the housing, said diaphragm extending transversely across the interior of the cavity; (c) after inserting the housing and spindle into the cavity so that the cutting tool is proximate to the valve seat, but out of contact therewith, axially clamping a portion of the diaphraphm remote from the spindle, against the axially clampable surface; and (d) moving the rotary driven spindle assembly axially toward the valve seat to conduct machining contact of the cutting tool therewith, the axially resilient diaphram providing accurate transverse supporting alignment for the tool under even high-speed machining conditions.

It is preferable to also simultaneously machine a valve stem guide bore surface at the time of machining the valve seat. The method, to do this, further comprehends the provision of a centrally aligned internal slide bore in the spindle, and slidably supporting a second rotary driven cutting tool or reamer at the extremity of a telescoping rod in the slide bore of the spindle; and, while the seat is undergoing machining, hydrodynamically or pneumatically squirting said telescoping rod, carrying the second cutting tool, through the slide bore to conduct machining of the guide bore surface with the second tool.

Advantageously, the spindle housing support may carry at least two spindles for machining tandem valve seats as well as tandem second spindles for machining their associated valve stem guide bore surfaces, the spindles being located radially remote from the clampable surface.

The invention, in another aspect, is also apparatus for machining valve seats, which comprises: (a) a rotary spindle support having a nonrotatable housing effective to fit closely to the interior of the cavity within a tolerance of 0.01 inches and effective to move along the axis of the cavity, a first rotary spindle carried within a central bore of the housing and movable axially with the housing; (b) a cutting tool carried by the lower extremity of the spindle for machining the valve seats at the end of the workpiece cavity; and c) clamping means for securing the housing against radial movement when the extremity of the spindle of the housing is located proximate to the valve seat, but allowing limited axial movement of the housing and spindle to permit machining contact between the cutting tool and workpiece. The spindle support may also be constructed to have a central slide bore, and a second rotary driven spindle is carried in the slide bore. The second spindle has a second rotary cutting tool at its extremity, said second spindle being selectively forced through the slide bore for contacting a machinable surface axially remote from the valve seat.

DETAILED DESCRIPTION AND BEST MODE

The method of this invention is for machining valve seats at the end of an axially deep, narrow cavity of a workpiece having an axially clampable surface within the cavity adjacent one or more valve seats. The method comprehends essentially four steps: (a) supporting a rotary driven spindle assembly of sufficient length to extend through the axial extent of the cavity and reach the valve seat, the spindle carrying a cutting tool at its extremity, the support being in a nonrotatable housing effective to fit closely to the interior of the cavity and effective to move along the axis of the cavity to bring the cutting tool into machining contact with the valve seats; (b) securing a radially rigid but axially resilient diaphram to the end of the housing, the diaphram extending transversely across the interior of the cavity; (c) after inserting the spindle assembly into the cavity so that the cutting tool is proximate to the valve seat, but out of contact therewith, axially clamping a portion of the diaphram remote from the spindle, against the axially clampable surface; and (d) moving the rotary driven spindle assembly axially toward the valve seat to permit machining contact of the cutting tool therewith, the axially resilient diaphram providing accurate transverse supporting alignment for the tool under even high-speed machining conditions.

Figure 2:
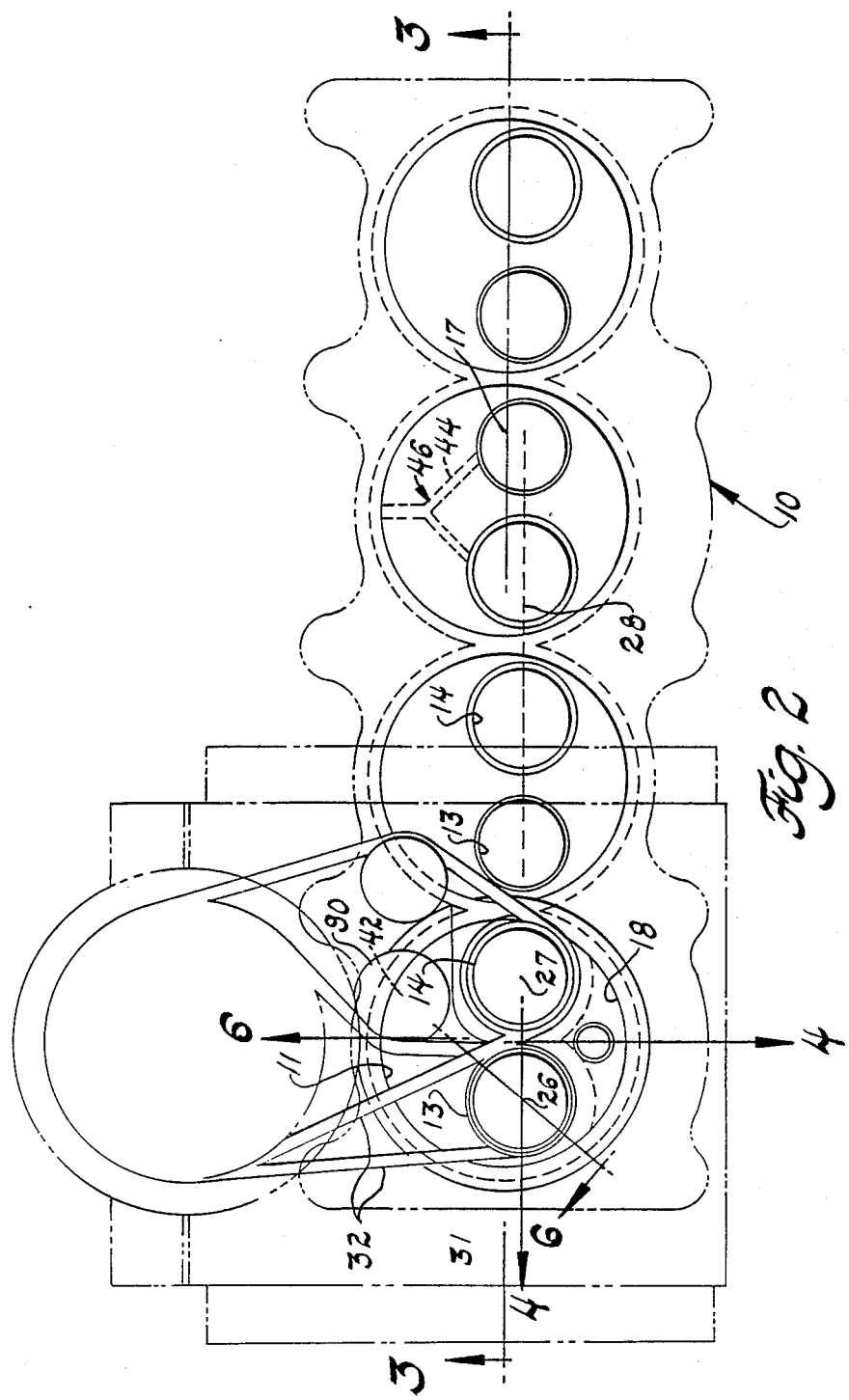
FIG. 2 is a plan view of machining apparatus, embodying principles of this invention, and used to machine such monoblock workpiece.
Figure 3:
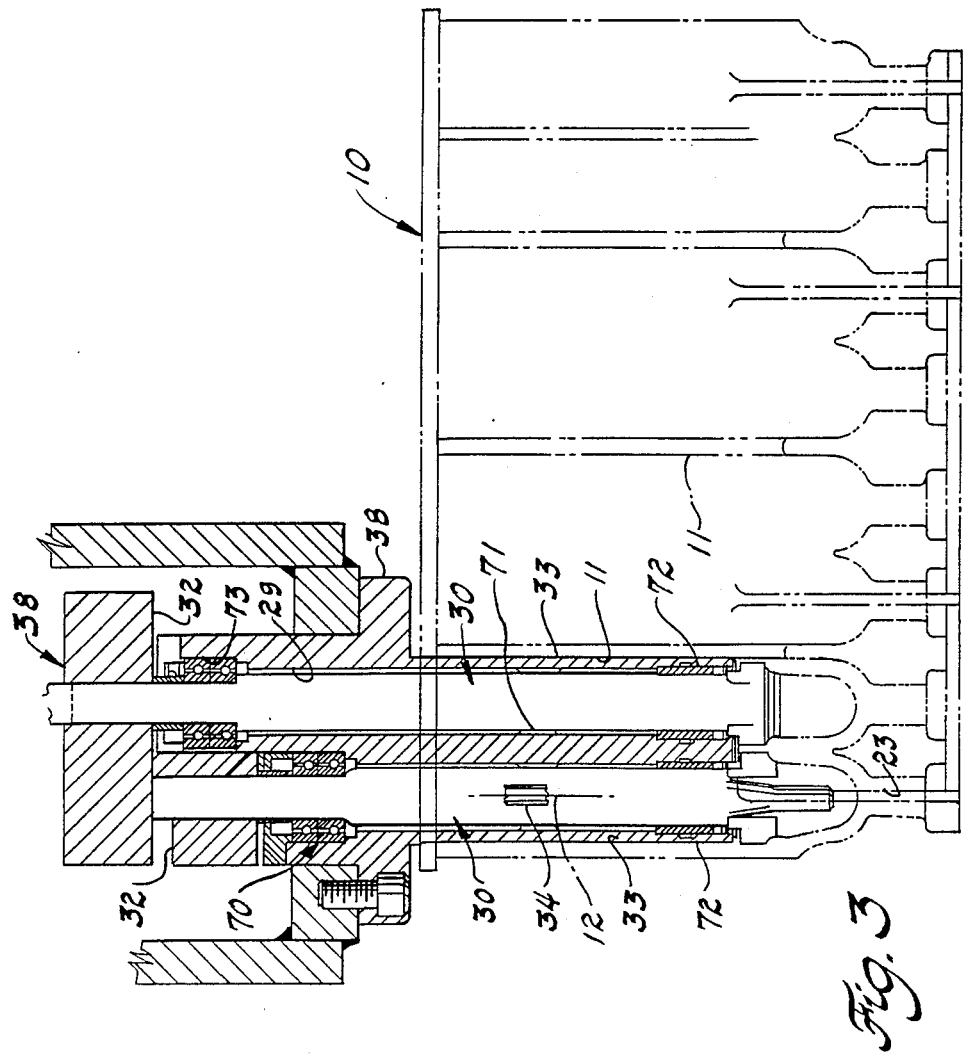
FIG. 3 is a central sectional elevational view of the apparatus of FIG. 2 taken along line 3—3 thereof.
Figure 4:
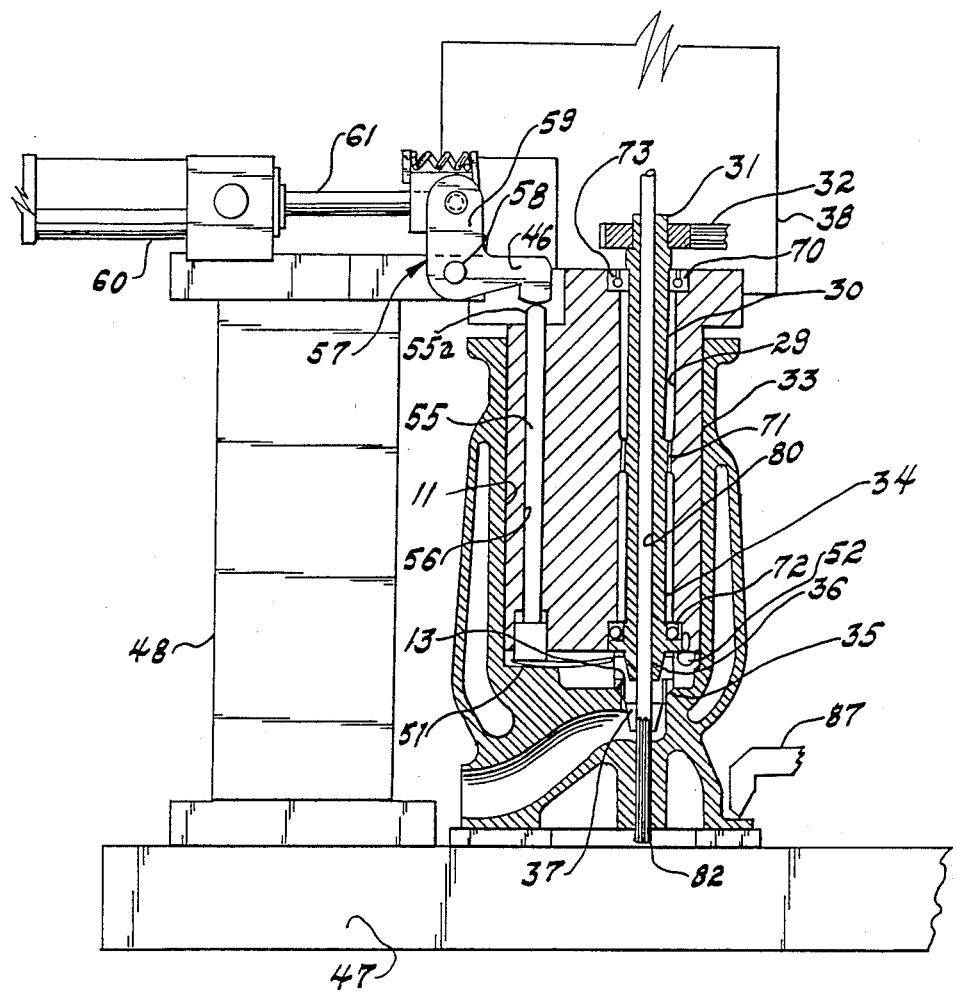
FIG. 4 is a sectional elevational view of a part of the structure in FIG. 2 and taken along line 4—4 of FIG. 2.

The workpiece and apparatus for carrying out the method is described below. Monoblock Workpiece As shown in FIGS. 1–3, the monoblock workpiece 10 has a plurality of deep-walled cylinder cavities 11, each cavity being narrow and axially deep along axis 12; for example, the axial extent of each cavity may be in the range of 5–9 inches. The monoblock may be designed to be cast-in-place in an aluminum jacket. At the end of each of the cavities is provided at least one intake valve seat 13 and at least one exhaust valve seat 14, usually having their respective axes 15 and 16 lying in a plane 28 offset from the centerline plane 17 containing cavity axis 12 (see FIG. 2). Also at the end of such cavities, is an axially clampable surface 18 (shown in FIGS. 2 and 4) adjacent one or more of the valve seats. To be axially clampable, the surface must extend transversely across the interior of the cavity and such surface is preferably flat and on a plane perpendicular to the axis 12. Such surface can ideally be a flat squish surface employed in designs of modern fast-burn engines; the squish surface serves to propel the combustion gases, undergoing compression as the piston reduces the combustion chamber volume, and encourages a unique toroidal squish of such gases. Such squish surface is configured as a generally triangular flat pedestal at the end of the cylinder bore of cavity 11, as shown in FIGS. 2 and 4.

Exhaust gas passage 20 extends from the valve seat 14 to a remote side wall 24 location, and intake gas passage 21 extends from valve seat 13 to an opposite remote side wall 25 location. Valve stem guide bore surfaces 22 and 23 are defined in the monoblock 10, with each having their respective axes 15 and 16 aligned with the centers 26,27 of their associated valve seats 13,14.

The workpiece or monoblock is preferably comprised of cast iron which is machinable at high speeds of 2500–5000 sfm.

Spindle Support

As shown in FIG. 4, a spindle assembly 30, rotary driven at its upper end 31 by suitable rotary power through belts 32, is supported in a nonrotatable housing 33 for high-speed rotation. The spindle 34 of assembly 30 is of sufficient length to extend through the cavity 11 and reach the valve seats 13 or 14. The spindle may be comprised of low carbon steel and does carry a valve seat cutting tool or means 35 at its lower extremity 36, the cutting tool or means 35 being held in place thereon by a collet 37 threadably received on the extremity 36 and effective to clamp the tool 35 in an axial position thereon (see FIG. 5).

The housing 33 is configured to fit closely to the cross-sectional interior of the cavity 11 with a tolerance of plus or minus 0.01 inches; the housing is movable along the axis 12 of the cavity by virtue of a support structure 38. Such an axial movement of the housing is effective to bring the cutter tool or means 35 into machining contact with a valve seat 13 or 14. The spindle 34 is supported for high-speed rotary motion in spindle bore 29 of the housing by use of three bearings 70,71,72. Bearing 70 is located at the upper extremity of housing 33 and may be comprised of one or more suitable ball bearing assemblies having independent races interposed within grooves 73 of the bore 29. The bearing 71 is interposed between the bore wall 29 and the spindle 34 at a mid-axial location and may be comprised of a hardened steel sleeve honed to a close finish tolerance. The bearing 72 is of critical importance and is located at the lower extremity of the spindle 34 adjacent the attachment of the machining tool or means 35 to the spindle. As shown in FIG. 5, such bearing 72 may be comprised of a plurality of rolling elements 74 adapted to operate against a surface 75 defined on the spindle 34 and designed to act as the inner race of the bearing; a surface 76 is defined on a sleeve 77 received in a step 78 in the bore surface 29 to serve as the outer race of the bearing. Alternatively, a multiple support hydrodynamic bearing may be employed which may use a plurality of nozzle openings in the spindle housing which jet hydrodynamic fluid to maintain concentricity of the spindle 34 within the circular bore 29; the nozzles may be interconnected from a pressurized source of fluid through drilled axial passages in a remote region of the housing (not shown). The use of the intermediate and lower extremity bearings 71,72 is important in that they provide positioning and vibration deflection resistance, particularly at extremely high speeds such as 10,000 rpm.

As shown in FIG. 6, oil for lubricating the roller bearings 70 and 72 is injected by a control valve 46 from a supply passage 41 and delivered to the respective bearings by oil passages 44 and 45.

It is desirable to also simultaneously machine a valve stem bore surface 22 or 23 at the time of machining the valve seats. This may be carried out by providing a centrally aligned internal slide bore 80 within the spindle 34. A slidably supported, rotary driven, second spindle or rod 81 is telescopically carried in such slide bore and may integrally comprise a cutting tool or reamer 82 at its lower extremity. After the spindle 34 is in position for cutting the valve seat, hydrodynamic or pneumatic means 83 may be actuated to squirt the second tool through the slide bore 80 to have the reamer 82 properly contact the guide bore surface 23 and machine the same.

To simultaneously machine both valve seats in a single cavity, tandem spindle assemblies may be used as shown in FIGS. 2 and 3. Auxiliary belt sprockets 90 on auxiliary shafts 42 in bearings 43 (see FIG. 6) may be needed to accommodate intricate belt paths for such tandum rotary drive.

Internal Clamp

As shown in FIGS. 4 and 5, a radially rigid but axially resilient diaphram 51 is secured, such as by a suitable fastener 52, to a location 53 on the end 50 of housing 33. Such location 53 is preferably diametrically opposite the location 54 of the housing where clamping is to take place. The diaphram normally lays flat against the end 50 of the housing 33. The diaphram is a thin (i.e., 1/64 inch thick), stamped metal disk made of material such as spring steel, beryllium or bronze metal. The configuration of the disk is complementary to the cross-sectional area of the housing end 50, and is sufficiently flexible to allow for a deflection of between 0.010–0.02 inches as measured between diametrically opposite edges of the disk.

A clamping rod 55 is adapted to move axially and snugly within a bore 56 of the housing 50 by use of sleeve bearings 49. The upper end 55a of the rod is contactable by a crank member 57, pivotal at 58, and having a crank arm 59 actuatable in a horizontal direction to promote a downward movement for gripping or release of the clamping rod. A pneumatic or hydraulic cylinder 60 can be used to provide such actuation. When the cylinder 60 is actuated to promote movement of the crank arm; cylinder rod 61 is caused to move to engage crank arm 59 and turn crank 57 clockwise, forcing clamp rod 55 downwardly through bore 56. The lower extremity 55b of rod 55 will protrude beyond end 50 of housing 33 to force the diaphram 51 against the clamping surface 18 of the monoblock. The engagement of rod 55 with the disk is at a location immediately below location 54 on the housing end.

As illustrated in FIG. 4, an upright frame structure 48 extends from a pedestal 47 for the monoblock; the monoblock is secured to the pedestal by a jaw 87. The frame structure 48 rigidly supports the cylinder 60, crank pivot 58, and stabilizes the housing 33 in a horizontal plane. Through this interrelated structure, a C-clamp is effectively formed with the monoblock and surface 18 locked therebetween.

Operation

The monoblock or workpiece is secured to pedestal 47 by jaw 87. Housing 33 is then lowered into a cavity 11 of the secured monoblock workpiece to an extent so that the cutting tool for the valve seat is within 0.010 inches of the valve seat but out of contact therewith. Clamping rod 55 is then actuated by cylinder 60 to protrude beyond the housing end 50, deflect one side of the diaphram 51 downwardly, and clamp the diaphram against flat squish surface 18. The spindle housing 33, supporting the spindle 34, is thus held radially rigid with respect to the cavities of the monoblock workpiece. The diaphram is very stiff in a radial direction (the plane of the disk) but flexible in the axial direction transverse to the disk.

The housing 33 and spindle 34 is then moved downwardly the remaining small distance to bring the disk substantially into a flat condition, causing the cutting tool to engage the valve seat for carrying out machining.

Simultaneously or sequentially, the second tool or squirt reamer 82 is fed through the internal slide bore 80 within the spindle 34, and such second cutting tool reams the valve stem guide bore 23 or 24 to a precise dimension concentric with the associated valve seat.

The second cutting tool is then withdrawn from the valve stem guide bore, the housing 33 and spindle assembly 30 is raised with respect to the machined valve seat a distance of about 0.01–0.02 inches. Next, the clamping rod 55 is unclamped by actuating the cylinder 60 to a release position allowing the clamping diaphram to return to its position flat against the end 50 of the housing 33. The housing and spindle assembly is then lifted out of the workpiece, completing the machining cycle.

While particular embodiments of the invention have been illustrated and described, it will be obvious to those skilled in the art that various changes and modifications may be made without departing from the invention, and it is intended cover in the appended claims all such modifications and equivalents as fall within the true spirit and scope of the invention.

I claim:

1. An apparatus for machining valve seats at the end of an axially deep cavity of a workpiece having an axially clampable surface adjacent one or more of said valve seats, the apparatus comprising:
   (a) a rotary spindle support having a nonrotatable housing effective to fit closely to the interior of the cavity within a tolerance of 0.01 inches and effective to move along the axis of the cavity, a first rotary spindle carried within a central bore of said housing and movable axially with the housing;
   (b) a cutting tool carried by the lower extremity of said spindle for machining said valve seats at the end of said workpiece cavity; and
   (c) clamping means for securing said housing against radial movement when the extremity of the spindle of said housing is located proximate to said valve seat but allowing limited axial movement of the housing and spindle to permit machining contact between the cutting tool and workpiece.

2. The apparatus as in claim 1, in which said spindle support further comprises a central slide bore within the first spindle and a second spindle carried within such slide bore, said second spindle being ejectable from said first spindle to carry a second cutting tool for contact with a machining surface axially remote from said valve seat.

3. The apparatus as in claim 2, in which said workpiece has valve stem openings generally aligned with said valve seats, and said second cutting tool is effective to machine said valve stem opening while said first cutting tool is effective to machine said valve seats.

4. The apparatus as in claim 1, in which said rotary spindle support comprises a sleeve bearing operative between said first spindle and a generally mid-axial location of said non-rotatable housing, and a roller bearing operative between said first spindle and the extremity of said non-rotatable housing.

5. The apparatus as in claim 1, in which said rotary spindle support comprises hydrodynamic bearings interposed between said first spindle and non-rotatable housing at the extremity of said non-rotatable housing.

6. An apparatus for machining valve seats at the end of an axially deep cavity of a workpiece having an axially clampable surface adjacent one or more of said valve seats, the apparatus comprising:

(a) a rotary spindle support having a non-rotatable housing effective to fit the interior of said cavity and to move along the axis of the cavity;
(b) a spindle rotatably carried within said housing and movable conjointly axially with said housing;
(c) a cutting tool carried by an extremity of said spindle for machining said valve seats at the end of said workpiece cavity; and
(d) clamping means for securing said housing against radial movement when the extremity of the spindle of said support is located proximate to said valve seat but allowing limited axial movement of the housing and spindle to permit machining contact between the cutting tool and a valve seat.

7. The apparatus as in claim 6, in which said clamping means comprises a radially rigid but axially resilient diaphragm secured at one end to the non-rotatable housing, and a rod actuatable to clamp a free end of said diaphragm to a wall of said cavity.

8. The apparatus as in claim 6 which further comprises tandem first spindles in said non-rotatable housing to simultaneously machine a pair of valve seats.

* * * * *